R. FRICK.
RECORDING MECHANISM.
APPLICATION FILED JAN. 19, 1909.

1,078,138.

Patented Nov. 11, 1913.
2 SHEETS—SHEET 1.

Witnesses.
F. S. Amstutz
A. Wilbur

Robert Frick Inventor
By
N. S. Amstutz
Attorney.

R. FRICK.
RECORDING MECHANISM.
APPLICATION FILED JAN. 19, 1909.

1,078,138.

Patented Nov. 11, 1913.
2 SHEETS—SHEET 2.

Witnesses
F. S. Amstutz
A. Wilbur

Robert Frick Inventor

By
H. S. Amstutz
Attorney.

UNITED STATES PATENT OFFICE.

ROBERT FRICK, OF CHICAGO, ILLINOIS.

RECORDING MECHANISM.

1,078,138. Specification of Letters Patent. Patented Nov. 11, 1913.

Application filed January 19, 1909. Serial No. 473,190.

*To all whom it may concern:*

Be it known that I, ROBERT FRICK, a citizen of the United States, residing at Chicago, in the county of Cook and State of Illinois, have invented new and useful Improvements in Recording Mechanisms, of which the following is a specification.

My invention relates to improvements in automatic recording mechanisms and it consists more especially of the several features pointed out in the annexed claims.

The purpose of my invention is to provide a positive record for use in automobile or other service which shall not require refilling with paper at stated periods and which shall however, at stated periods of time show within such limits the specific periods when the device with which it is connected has been used and the relative speed of such operation.

Provision is made for automatically erasing the record at the end of any desired time, to show in plain figures the rate of movement, the total movement within short periods and a maximum of all movements. All of these facilities are combined in my invention. In addition I make provision for sealing up the entire mechanism and its operating elements to prevent meddling of any sort whatever.

The features of my invention are illustrated in the accompanying drawing, in which there is shown an instance of adaptation that discloses the underlying principles thereof without limiting myself to the specific construction shown.

With such ends in view and conformable to the principles outlined I show such an instance of adaptation in the several figures of the drawings as will enable those skilled in the art to understand the features of my invention, even though they are shown in a more or less diagrammatic manner.

Figures 1, 2:
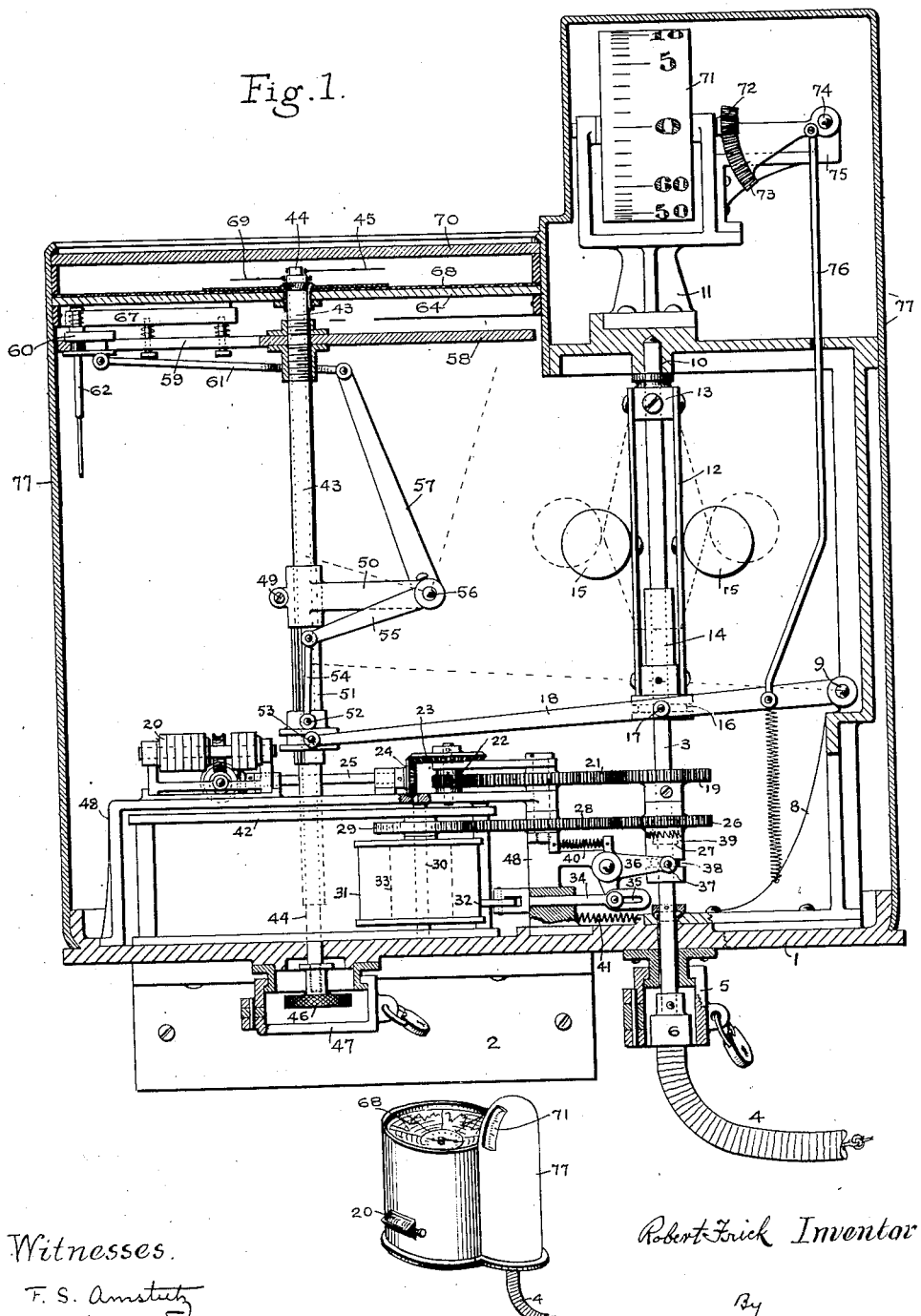
Figure 3:
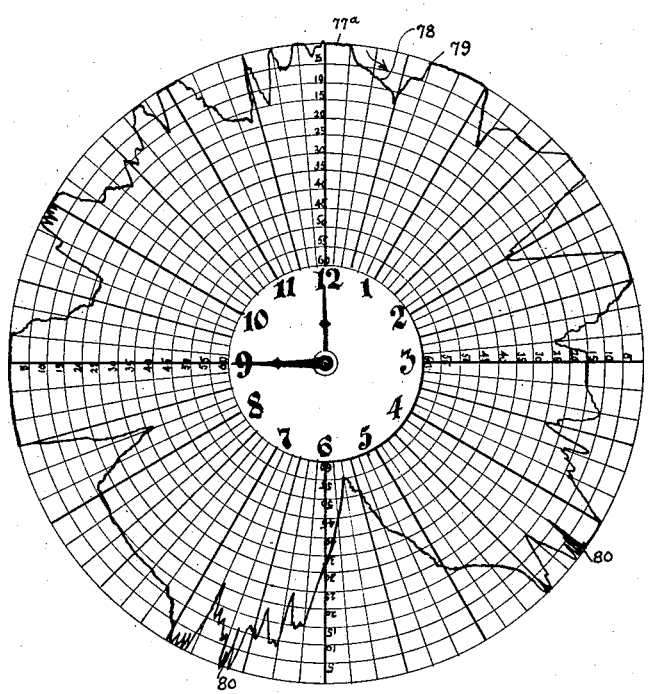
Figure 4:
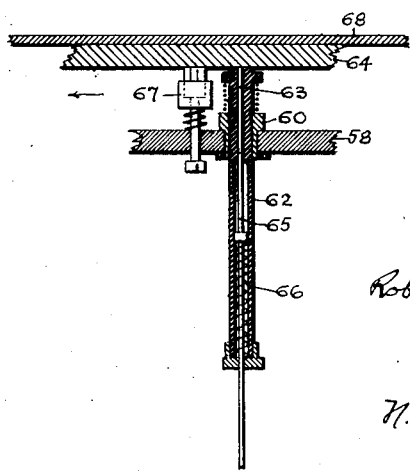

Figure 1.—is a front elevation in section. Fig. 2.—is a small perspective view. Fig. 3.—is a plan view of the dial and a record. Fig. 4.—is a cross section of the erasing device and the recording point.

Before proceeding to the detailed description it is well to amplify the description of the advantages that are an inherent part of my method.

The fundamental features are just as applicable to recording mechanisms for steam engines, printing presses, steam boilers and a hundred and one purposes that might be mentioned.

In all recording devices it is important to insure the record against being tampered with, and I accomplish this by sealing up the case in the process of manufacture or if desired with security padlocks. The sealing up of recording cases with padlocks has been done before but heretofore whenever one record sheet became filled it was necessary to insert another—affording ample opportunity of tampering with the mechanism. On my basis there is no necessity of inserting new record sheets as the old record is automatically erased after the lapse of a predetermined period hence the opportunity for meddling can not exist because the case is not opened for the insertion of record sheets. The length of period that will elapse before the record starts to disappear through the erasing action of the record removal pads may be varied in different instruments to meet the specific needs of every adaptation to which they may be put. In some cases 12 hours will be found sufficient, in others 24 and again a week or longer period if desired. For very large variations in total time other sizes of recording disks conforming to the special purposes would be made as needed. Any variations of this kind will not depart from the fundamental features of my invention and the present description and drawings are not to be construed as limiting me to one form or another.

In the instance I have chosen to illustrate there is provided a common base, 1, that supports all the mechanism and the casing. A suitable bracket, 2, serves to hold the device wherever desired. The driving shaft is connected with the flexible connecting shaft, 4, of ordinary construction. This is sealed at both ends so that it cannot be tampered with. In the drawing but one end is shown because the same form of "seal" is used at both ends. A two-part hinged casing, 5, encircles the pinned terminal head, 6, of the shaft, 4, and the two halves are held by a padlock that passes through an opening in each half. The two halves also encircle a flanged supporting plate, 7, that holds the seal in position to cover the pin by which the flexible shaft, 4, is held on shaft, 3, by means of the head, 6, so as to securely cover these parts. A similar seal is provided to protect the time setting thumb-nut, 46, secured on the minute hand spindle, 44, of the clock 42.

A cast frame, 8, rests on the base, 1, and projects upward to form fulcrum, 9, bearing, 10, for the upper end of shaft, 3, and support for the speed indicator frame, 11. The shaft, 3, carries the governor which may be of any desired form. The upper collar, 13, is secured to shaft, 3, while the lower or sleeve-end, 14, is free to slide up and down on the shaft, 3, as the balls, 15, are thrown outward when the shaft is in motion, through the springs, 12, that connect collars, 13, and, 14. Collar, 14, has an annular groove, 16, formed at its lower end in which pins or rollers 17, of the lever, 18, move. This lever may pass on one side of the collar groove only but it is preferable to form it in two halves so as to encircle the collar and thus hold an equilibrium of the working parts. Shaft, 3, also carries spur gear, 19, that controls the trip and total distance registering device, 20, through idler gear, 21, pinion, 22, bevel gears, 23, and, 24, and shaft, 25.

Directly below the gear, 19, is a loose gear, 26, that has clutch teeth formed on its hub. It is held in position, endwise of the shaft by a suitable collar, 27. This gear is directly connected by intermediate, 28, onto gear, 29, on the spring shaft, 30, whereby the clock spring, 31, is automatically rewound whenever required. This is effected by a control wheel, 32, which rolls on the spring as it changes its relative position when unwound, as shown, or wound as indicated by the dotted lines, 33. The roller, 32, is secured on a sliding rod, 34, which has a slotted end, 35, in which a pin of the bell-crank, 36, is operative. The other arm of this bell-crank is bifurcated and is provided with two pins, 37, that work in the annular groove, 38, of the clutch sleeve, 39, and control the working relation of the sleeve, 39, and hub of the gear, 26. A spring, 40, and another, 41, respectively control the bell-crank, 36, and sliding rod, 34. Whenever the spring, 31, is unwound the wheel, 32, is at the greatest distance from the shaft and the sleeve, 39, is thrown into mesh with the toothed hub of gear, 26, so that the spring is rewound by gears, 26, 28, and, 29. As soon as it is fully wound the wheel, 32, having followed the spring, 31, has thereby drawn the clutch sleeve, 39, away from gear hub, 26, thus stopping the winding action. Sleeve, 39, is splined to shaft, 3, so as to rotate with it but still have endwise movement thereon.

The usual train of gears of the clock work, 42, is not shown as the relation existing between the several parts is so well known and understood. The hour hand tube, 43, is however shown and the minute hand spindle, 44, passing throughout its length, terminating at its upper end in the usual minute hand, 45, and at its lower end in the thumb nut, 46, by which the time may be adjusted as is common in clocks of the usual "alarm" type. This setting device is inclosed in a two part "seal", 47, secured by a padlock to prevent unauthorized access.

The automatic rewind and the register are supported in a self-contained manner on a suitable bracket, 48, which insures all of the parts maintaining their best working relation. Similarly the shaft, 3, is held in the one-piece frame, 8, so that its bearings are kept in alinement with the least complexity of construction.

The hour tube, 43, carries a clamping sleeve, 49, which has a projecting arm, 50, formed thereon. The lower end, 51, of the sleeve, 49, is reduced in diameter and a spline is placed thereon. On this the slidable collar, 52, has endwise movement. This collar has an annular groove in which a pair of pins, 53, of the lever, 18, operate. A pair of links, 54, are pivoted to the collar and to a pair of crank arms, 55. These arms are secured to a common shaft, 56, on which the long crank arm, 57, is also fastened. This shaft is held in the projecting arm, 50. As the hour tube, 43, rotates these parts are all carried with it.

The upper end of the tube, 43, carries the recording device which comprises a disk, 58, having a radial slot, 59. In this slot the recording point holder, 60, slides to and fro as the rotative speed of the governor on shaft, 3, varies. As shown the parts are represented as being in a state of rest. When the speed rises the governor sleeve 14, is raised, the arm, 18, and the links, 54, being carried with it and these, through cranks, 55, 57, and link, 61, cause the slide, 60 to move toward the center of the disk, 58. From this it is seen that the highest speeds are recorded near the center, as shown in Fig. 3, leaving the more open space near the periphery of the disk for the greatest average speeds. The slide carries a tube, 62, in which is placed a pencil lead, 63, of suitable quality. This is of small diameter so as to make a fine record line. It is held in position against the recording disk, 64, by a follower, 65, and a coil spring, 66, or other means. Whatever means are used to hold the recording point against the disk, 64, it must have practically the same tension at all times, whether the lead, 63, is short or long. From tests made this point will suffice for records extending over a period of years.

Alongside of the slide, 60, is a suitable spring pressed erasing pad, 67, also carried by the disk, 58. It is placed radially and slightly in advance of the recorder so as to erase any previous record there may be on the disk, 64. In addition it also serves to lubricate the surface of the disk, 64, so as to better take a record without imposing too much friction on the clock and also make it easier to again erase the same. The recording side of the disk, 64, is slightly grained or "ground" and the opposing face of disk, 58, being quite white makes the line formed by the pencil, 63, easily visible. On the opposite face of the recording disk a transparent index or dial, 68, is secured showing by radial lines the hours and minutes and in concentric lines the varying rates of speed or any other value as desired. Around the center the usual clock symbols are placed and the hour hand, 69, and minute hand, 45, perform their usual function in connection therewith. Above these disks a cover glass, 70, is placed, protecting the mechanism beneath.

The speed indicator consists of a light weight drum, 71, with large symbols marked thereon so as to be easily recognizable. This drum is secured on a spindle or shaft supported on a bracket, 11, and it has a pinion, 72, at its end. A segment, 73, meshes with this as it oscillates on its pivot, 74, of the bracket, 75, through the connecting link, 76, pivoted to it and the arm, 18, as shown.

The entire casing, 77, is "spun" into the base, 1, or secured in any other manner that will insure its being held securely against meddlesome hands.

The hypothetical record on Fig. 3, shows how easy it is to determine the stops, speed spurts, etc., without any calculations whatever. Suppose the owner of a car sets the recorder and eraser with a clear disk so as to commence recording at 12 o'clock and allow the machine to stand idle for 10 minutes, a concentric zero line as shown at, 77ª, will be formed. The car is started and the curved line, 78, is made showing at the end of 20 minutes additional a speed of 15 miles per hour, then in five minutes it has dropped to five miles per hour remaining at this speed for three minutes—a concentric line—then stopping, bringing the line to zero again at, 79, where it remains for about 22 minutes. When many stops and starts are made in close succession a 12 hour disk will show a gradual thickening of the record as marked at, 80. If the whole revolution was made in only six hours these would of course be expanded so as to be more in evidence.

In using my device the owner of a car always has an absolute record of its movements for a period of the last twelve hours, thus giving him a check on the movements of his chauffeur which any mechanism that requires the insertion of a record sheet cannot give with the same assurance of reliability.

Should it ever be desired to keep a permanent record of the 12 hour runs they may be made with a special camera that would rest on the cover glass and in combination with a source of light beneath the recording disk a permanent photographic record would be made. The camera lens would insure the sharpness of the record lines as well as those of the index or dial, 68.

The recording pencil is held in the tube, 66, and this tube is delicately pressed against the recording disk, 64, by a spring as shown in Fig. 4 so as to prevent the last portion of the pencil from being ejected. In order to show the amount of lead remaining at any time I may form a projecting stem to the follower, 65, that will pass inside of the spring, 66, and out through the cap of tube, 62. The distance such stem projects forms an indicator of the length of lead remaining in front of the follower, 65.

A very valuable feature of my device lies in the difference there is produced when the record is changed or erased automatically or by hand, as when the time is set for one reason or another by an unauthorized person. When erased by hand the glass is not left so clean and clear as when the clock movement produces the erasure, thus any meddling may be detected at once. If the owner himself changes the time record by hand erasing he can make arbitrary stops and starts wherever desired. By keeping a memorandum of these he can tell immediately if some one else has attempted to erase a record during a similar time period covered by such setting because no two erasures can be made exact duplicates of each other.

What I claim is—

1. In automatic recorders, a recording surface, a timing device and a recording mechanism controlled thereby, a speed indicator, connections therefrom to said recorder, and erasing means adapted to move over the recording surface in advance of the recorder whereby the recording surface is automatically and simultaneously prepared for a new record.

2. In automatic recorders, a driving connection, a timing device, a recording mechanism adapted to move radially so as to form a record through visible marks produced on the recording surface without changing the characteristics of the surface itself, a recording surface, and an erasing device moving slightly in advance of the recorder the same being adapted to automatically remove a previously formed record without disturbing the recording surface.

3. In recording mechanism, the combination of a recording mechanism and an erasing device, adapted to operate adjacent each other with means for producing a movement of said recording mechanism perpendicular to the direction of movement of the erasing device.

4. In recording mechanisms, the combination of a recording support, means for imparting thereto continuous unidirectional movement, a rotatable and radially movable recorder carried thereby, means for imparting to and fro movement thereto while said recorder is held adjacent to a recording surface, and means for automatically and simultaneously preparing said surface in advance of the recorder.

5. In automatic recorders, a suitable continuous recording surface, means for forming visible marks thereon through the deposit of colored particles, means for erasing such particles from said surface thus restoring the same to its original state, and means for coördinating the recording and erasing operations as to time and sequence.

6. In automatic recorders, an erasing device rotatable in one plane, a recording mechanism support rotatable in an adjacent parallel plane, a carrier rotatable therewith and supporting the recorder thereon, a semitransparent stationary recording surface placed adjacent to and in contact with said recorder, and means for imparting a variable radial movement to said recorder simultaneously to its being caused to move rotarily by means of said carrier.

7. In recording mechanisms, the combination of a semitransparent recording surface held in a stationary manner, a time indicating device movable near one face of said surface, and a recording and erasing device adapted to move against the opposite face of such surface.

8. In automatic recorders, a clock mechanism adapted to impart movement to time indicating hands and simultaneously maintain the rotation of a common support for a recording and erasing device, a semitranslucent or semitransparent recording surface held stationarily between the hands and the recorder and eraser, means for imparting a variable radial movement to said recorder, and means for recording said movement on said surface.

9. In recording mechanisms, the combination of a recording plate, a granular semitransparent abrasive surface formed thereon adapted to receive a visible record and also permit of the easy and complete erasure thereof, a recording device adapted to record on such surface, an erasing device operable on the said surface and a visual extraneous indicator showing the numerical value of said record.

10. In recording mechanisms, the combination of a recording surface, a time indicator, a speed recorder operable on one face of said surface and said time indicator movable adjacent the other face thereof.

11. In recording mechanisms, the combination of a recording surface, an indicating scale on one face and a recording and erasing device operative on the other face.

12. In a recorder, a recording surface exposed on one side, recording mechanism at the rear of the same, and means for actuating said mechanism to produce a record visible therethrough to display the same at the obverse side thereof as the record is made, in combination with a combined time and speed indicator placed adjacent to the exposed side of said surface.

13. In a recorder, a record sheet exposed on one side, recording mechanism at the rear of said sheet, and means for actuating said mechanism to produce a record visible through such sheet to display the same at the obverse side thereof as the record is made.

14. In a device of the character described, the combination of record making mechanism, a diaphanous record sheet and means for supporting the same in front of said mechanism with its obverse surface exposed to view, to adapt said sheet to receive, on its reverse surface, the markings of said mechanism and during the marking operations to expose the markings simultaneously with their production at the obverse surface of the sheet unobstructed by said mechanism.

ROBERT FRICK.

Witnesses:
 HENRY SCHOENHUTTE,
 FRED. FURTH.